United States Patent
Stan

(12) United States Patent    (10) Patent No.: US 7,307,931 B2
Stan    (45) Date of Patent: Dec. 11, 2007

(54) DETERMINING A VALUE OF A RECORDING PULSE PARAMETER FOR OPTICAL RECORDING

(76) Inventor: Sorin G. Stan, Argostraat 4, Eindhoven (NL) 5631 JZ ( * ) Notice: Subject to any disclaimer, the term of this patent is extended or adjusted under 35 U.S.C. 154(b) by 287 days.

(21) Appl. No.: 10/535,468

(22) PCT Filed: Nov. 7, 2003

(86) PCT No.: PCT/IB03/05119

§ 371 (c)(1), (2), (4) Date: May 17, 2005

(87) PCT Pub. No.: WO2004/047090

PCT Pub. Date: Jun. 3, 2004

(65) Prior Publication Data

US 2006/0028946 A1    Feb. 9, 2006

Related U.S. Application Data

(60) Provisional application No. 60/427,217, filed on Nov. 18, 2002.

(51) Int. Cl.
*G11B 7/00*    (2006.01)

(52) U.S. Cl. .............................. 369/47.53; 369/53.18; 369/53.33

(58) Field of Classification Search .................... None
See application file for complete search history.

(56) References Cited

U.S. PATENT DOCUMENTS 5,740,149 A * 4/1998 Iwasaki et al. .......... 369/47.53
2002/0105874 A1* 8/2002 Matsumoto ............... 369/47.53
2005/0243670 A1* 11/2005 Kakimoto et al. ....... 369/47.53

* cited by examiner

*Primary Examiner*—William R. Korzuch
*Assistant Examiner*—Peter Vincent Agustin
(74) *Attorney, Agent, or Firm*—Michael E. Belk

(57) ABSTRACT

A method is described for setting an optimum recording power level for recording information on an optical record carrier. First a series of test patterns is written on the record carrier with a different recording power. On reading the test patterns, the jitter values of each read signal is determined. The jitter as a function of recording power is approximated with two linear functions. The optimum recording power level for the record carrier is derived from intersection of the functions. The invention relates also to a device arranged to perform the method. The invention further relates to an optical record carrier comprising the optimum recording power as determined by the method according to the invention.

8 Claims, 3 Drawing Sheets

DETERMINING A VALUE OF A RECORDING PULSE PARAMETER FOR OPTICAL RECORDING

CROSS REFERENCE TO RELATED APPLICATION

This application claims the benefit of U.S. provisional application Ser. No. 60/427,217 filed Nov. 18, 2002. which is incorporated herein by reference.

This invention relates to the field of consumer devices, and in particular to techniques for preventing or discouraging the illicit duplication of copy protected material.

The invention relates to a method of determining a value of a recording pulse parameter for optical record carrier recording, where recording pulses are applied to a recording surface of the optical record carrier for writing a pattern of optically readable marks on the record carrier, said method comprising writing test patterns with pre-determined values of the recording pulse parameter, said values being different for each test pattern; reading the test pattern and forming a read signal; measuring jitter values of the read signal corresponding to each test pattern and forming a dependence of the jitter values versus the pre-determined values of the recording pulse parameter.

The invention also relates to a device for determining values of recording pulse parameter for optical carrier recording, comprising recording unit for writing a pattern of optically readable marks on a record carrier by irradiating a recording surface of the record carrier with recording pulses; a test signal generator for generating a test signal comprising a test pattern with pre-determined values of the recording pulse parameter and supplying the test signal to an input of a processing unit; reading unit for reading marks on the record carrier and supplying the read signal; control unit or optimizing the values of the recording pulse parameters and supplying a control signal representing the optimized recording pulse parameters; a jitter detector for measuring jitter values of the read signal corresponding to the test pattern and supplying the jitter signal to the control unit; processing unit for converting input information to be recorded into an output signal, the output signal corresponding to radiation pulses and representing the input information, where optimised value of the recording pulse parameters is provided by the control signal.

The invention further relates to an optical record carrier inscribable by recording pulses, comprising a substrate and means on the substrate including control information comprising a value of a recording pulse parameter.

In order to make a process of recording of information on optical record carriers reliable, optimization of recording pulse parameters is necessary. Recording pulse parameters are understood to be parameters, which directly control the recording process. They may include recording speed, power levels of the radiation beam used during the recording or width (duration) of recording pulses. Read parameters are understood to be parameters derivable from signals obtained when reading the information on the record carrier and which are useful for optimizing the values of the recording parameters. Jitter or modulation of the read signal are common examples of the read parameters.

Japanese patent application No 11005244 discloses a method for optimizing the values of recording pulse parameters for optical record carriers recording. In the known method, write tests are performed in order to form a dependence of read parameters (e.g. jitter) versus recording pulse parameters and to determine an approximation formula of the non-linear dependence. The optimized values of the recording pulse parameters are derived from the extreme values (maxima or minima) of the approximation formula. The known method requires high-order calculations, which are time-consuming and are usually too elaborate for recording devices using simple microprocessors.

It is an object of the invention to provide a method for determining a value of the recording pulse parameter for optical carrier recording using simple, first-order calculations. It is also an object of the invention to provide a device being operative to perform such a method and an optical record carried provided with information being indicate of the value of the recording pulse parameter.

The object is achieved by a method as described in the preamble, which is characterized in that two substantially monotonous parts of the dependence are distinguished and each of the substantially monotonous part is approximated with a linear function. The intersection of the linear functions is further determined in order to derive an optimized value of the recording pulse parameter. In the embodiment of the invention the recording pulse parameter is the power of the recording pulse. It is also advantageous when the optimized value of the recording pulse parameter is recorded either on the optical disc carrier or is stored in storage unit of a recording device.

The device as described in the preamble is, according to the invention, characterized in that the control unit is arranged to form a dependence of the jitter values versus the pre-determined values of the recording pulse parameter and to derive the optimized value of the recording pulse parameter by determination of an intersection of two linear functions, where each linear function is an approximation of substantially monotonous part of the dependence. In another embodiment, the device is equipped with a storage unit for storing the optimized values of the recording pulse parameters.

The optical record carrier as described in the preamble, according to the invention comprises control information with a value of a recording pulse parameter stored therein, where the value of the recording pulse parameter is optimized by determination of an intersection of two linear functions, where each linear function is an approximation of substantially monotonous part of a dependence of measured jitter values versus pre-determined values of the recording pulse parameter.

Although the invention is explained by using a DVD+R system as an example, it will be apparent to those skilled in the art that the invention may also be applied to others optical recording systems.

The objects, features and advantages of the invention will be apparent from the following, more specific description of embodiments of the invention as illustrated in accompanying drawings; therein:

Figure 6:
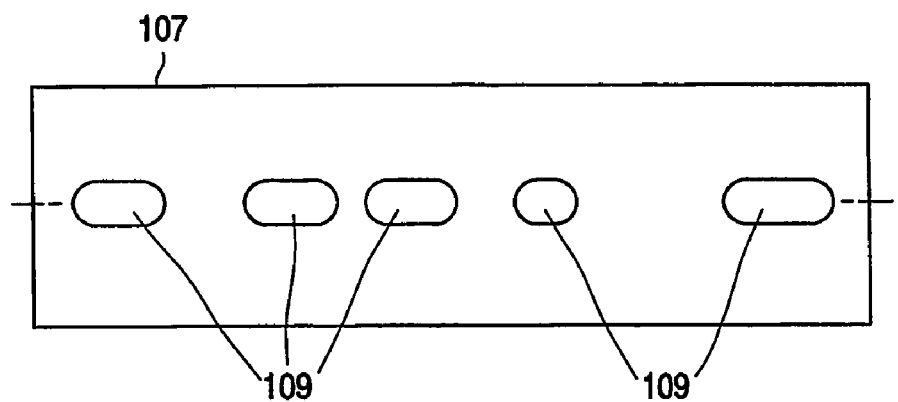

FIG. 6 shown a strongly enlarged portion of the track comprising a pattern of marks in which the control information is encoded.

Figure 1:
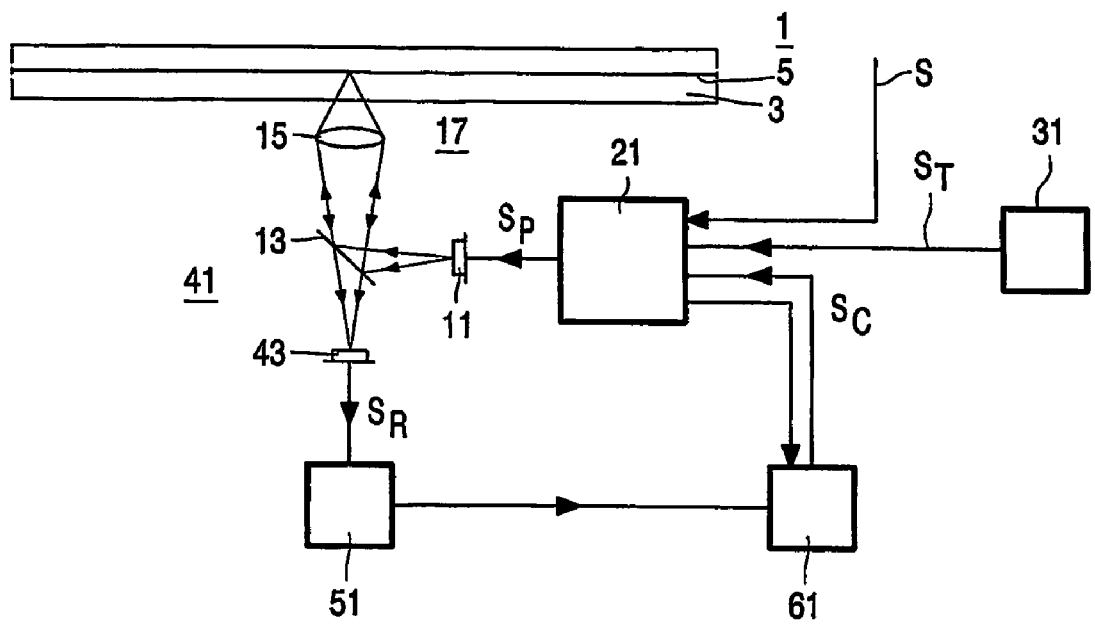
FIG. 1 shows a diagram of an optical recording device according to the invention.

FIG. 1 shows a device and an optical recording record carrier 1 according to the invention. The disk-shaped record carrier 1 has a transparent substrate 3 and a recording layer 5 arranged on it. The recording layer 5 comprises a material suitable for writing information by means of a radiation beam. The recording material may be phase-change, dye or any other material suitable for optical recording. Information may be recorded on the record carrier 1 in the form of optically detectable marks and lands on the record carrier.

The device comprises a radiation source, e.g. a semiconductor laser 11, for emitting a radiation beam. A mark is formed when the recording layer 5 of the recording record carrier 1 is exposed to a single recording pulse of the radiation, characterized by a recording pulse parameter, which in this embodiment is a recording power level. A mark may also be written by a series of radiation pulses of equal or different lengths and one or more recording power levels. The radiation beam is converged on the recording layer 5 via a beam splitter 13, an objective lens 15 and the substrate 3. The record carrier 1 may also be air-incident, where the radiation beam is directly converged on the recording layer 5 without passing through the substrate 3. The semiconductor laser 11, the beam splitter 13 and the objective lens 15 form together a recording unit 17.

The device comprises also a processing unit 21, which consists of, for example, a processor of the processing unit 23, where the processor is understood to mean any means suitable for performing calculations, e.g. a microprocessor or a digital signal processor. A signal S (e.g. an information signal or a test signal), representing the information to be written on the record carrier 1, is fed into the processor of the processing unit 21. The processing unit 21 determines the recording power level of the recording pulses for recording the information on the record carrier 1. Determination of the recording power level is performed taking into account an optimum recording power level $P_{opt}$ calculated by a control unit 61. The control signal $S_C$ of the control unit 61 is supplied to the processing unit 21. Once the optimum recording power level $P_{opt}$ for a specific record carrier 1 is calculated, it may be supplied to the processing unit 21 from the information recorded on the record carrier 1. An output of the processing unit 21 is connected with the semiconductor laser 11 and the control unit 61.

The device further comprises a test signal generator 31. The test signal generator 31 may consist of a processor of the test signal generator, which is suitable of generating the test signal $S_T$. The test signal $S_T$ should preferably represent a test pattern which, when coded in the so-called eighth-to-fourteen modulation (EFM), comprises marks of all length. The test signal $S_T$ may be a random signal. The test signal $S_T$ is supplied to the input of the processing unit 21.

The device further comprises a reading unit 41 formed by the semiconductor laser 11, the beam splitter 13, the objective lens 15, a detection system 43 and a circuit (not shown on the diagram) of the reading unit. The recorded record carrier 1 is exposed to the radiation beam at the reading power level $P_{read}$ emitted from the semiconductor laser 11. Radiation reflected from the record carrier 1 is converged by the objective lens 15 and, after passing through the beam splitter 13, falls on the detection system 43, which converts the incident radiation into electric detector signals. The detector signals are input to a circuit of the reading unit, which derives several signals from the detector signals, such as a read signal $S_R$ representing the information being read from the record carrier 1. The read signal $S_R$ is further fed into a jitter detector 51. The jitter detector 51 measures jitter values of the read signal $S_R$. The jitter is the standard deviation of the time difference between level transmissions in a digitized read signal and the corresponding transitions in a clock signal, the time difference being normalized by the duration of one period of said clock.

The jitter values are supplied into the control unit 61 comprising a processor of the control unit, which may be a simple microprocessor. The control unit 61 is also supplied with the signal $S_P$ from the processing unit 61 containing the values the recording power level P with which the test patterns have been recorded. The role of the control unit 61 is to derive an optimum value of the recording power level $P_{opt}$ for the record carrier 1 and supply a control signal $S_C$ to the processing unit 21.

Figure 2:
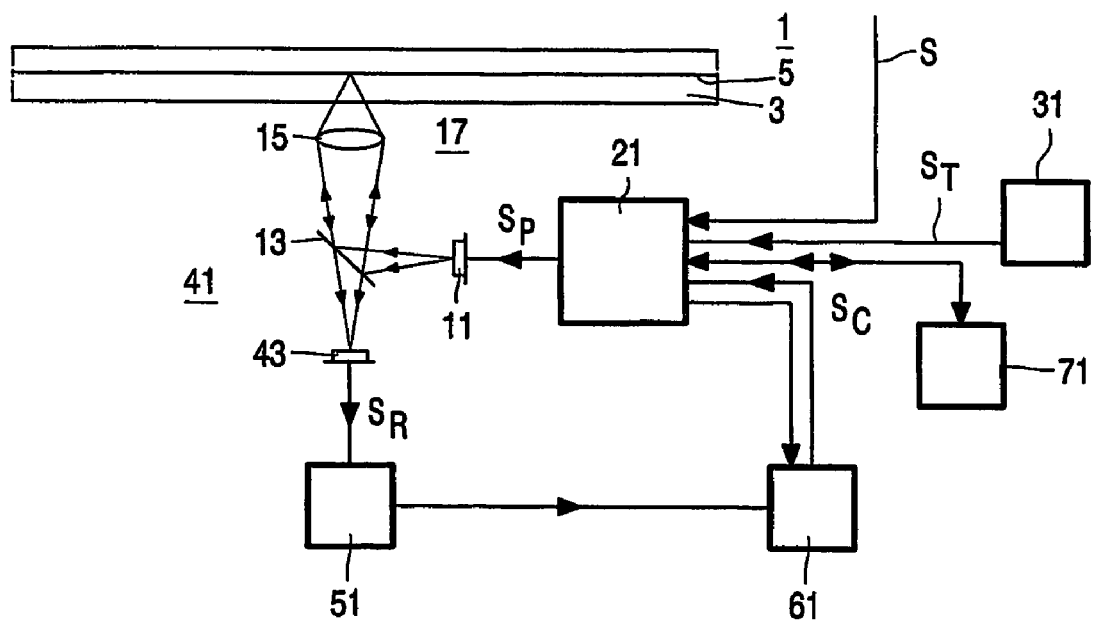
FIG. 2 shows a diagram of an optical recording device according to the invention in a different embodiment.

FIG. 2 shows another embodiment of the device according to the invention, the device comprising further a storage unit 71, which consists of, for example, a memory, where the memory is understood to mean any means suitable for storing data, e.g. a solid-state memory. In this embodiment, the optimum recording power level $P_{opt}$ for a specific record carrier 1 may be supplied to the processing unit 21 from the storage unit 71.

Before recording information on record carrier, the device sets its recording power level P to the optimum value by performing the following procedure. First, a series of test patterns are recorded on the record carrier 1, each with a different pre-determined recording power level P. According to the procedure, it is necessary to record N test patterns, where N is uneven number and (N−1)/2 is greater or equal to 7. The range of pre-determined powers may be selected on the basis of an indicative power level derived from control information on the record carrier 1. Subsequent patterns may be written with a step-wise increased power. The patterns may be written anywhere on the record carrier 1, also in specially provide test areas.

Figure 3:
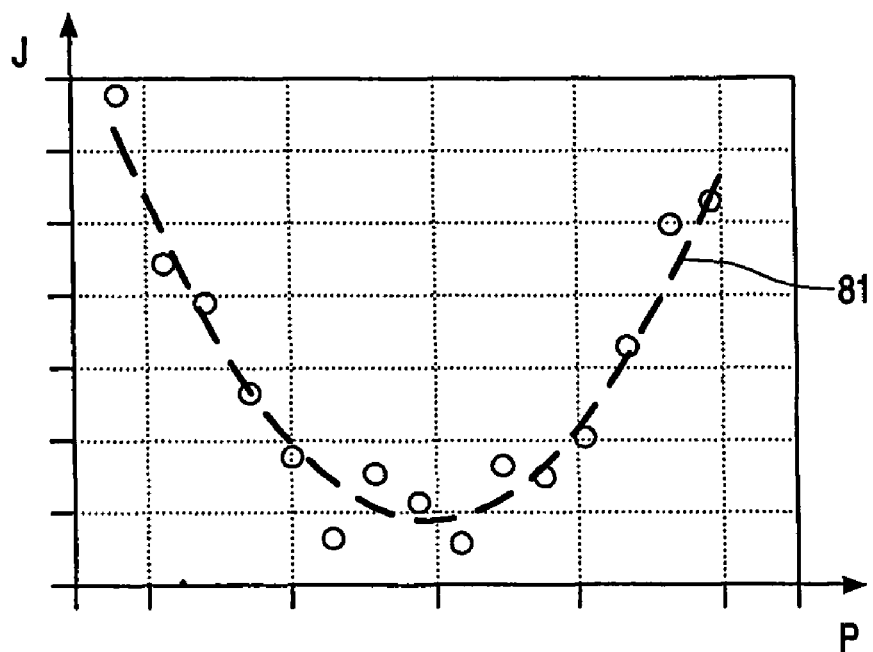
FIG. 3 shows jitter values in dependence with the recording power level of the laser irradiation fitted with a non-linear curve.

After reading the test patterns from the record carrier 1, the processor of the control unit 61 forms a series of value pairs for the jitter J of the read signal $S_R$ for each pattern, provided by the jitter detector 51, and the pre-determined recording power level with which that pattern has been recorded—provided by the processing unit 21. FIG. 3 shows a series of N=15 points, each representing a pair of values of jitter J and pre-determined recording power level of a test pattern. The points form a dependence 81 of jitter J values with respect to the pre-determined recording power level. It is apparent from FIG. 3 that the dependence exhibits a non-linear (bathtub) characteristics. The procedure according to the invention does not employ high-order calculations and the optimum recording power level $P_{opt}$ is determined solely by linear equations. The optimum recording power level $P_{opt}$ is derived from the recording power level of the minimum jitter value of the dependence 81.

Next, two substantially monotonous parts of the bathtub dependence 81 are distinguished. To this end, two series of points are formed, where the points having the extreme values of pre-determined recording power level (the least and the greatest recording power level) and the points around the vicinity of the jitter J minimum are omitted from the series. Mathematically the two series of points satisfy the condition given below, where N=15.

$$\begin{cases} (P_{lk}, J_{lk}) & \text{for } k = 2, 3, 4, 5 \\ (P_{rk}, J_{rk}) & \text{for } k = N-4, N-3, N-2, N-1 \end{cases} \quad (1)$$

where:

$P_{lk}$—pre-determined recording power level values of the left part of the dependence;

$J_{lk}$—jitter values of the left part of the dependence;

$P_{rk}$—pre-determined recording power level values of the right part of the dependence;

$J_{rk}$—jitter values of the right part of the dependence.

Figure 4:
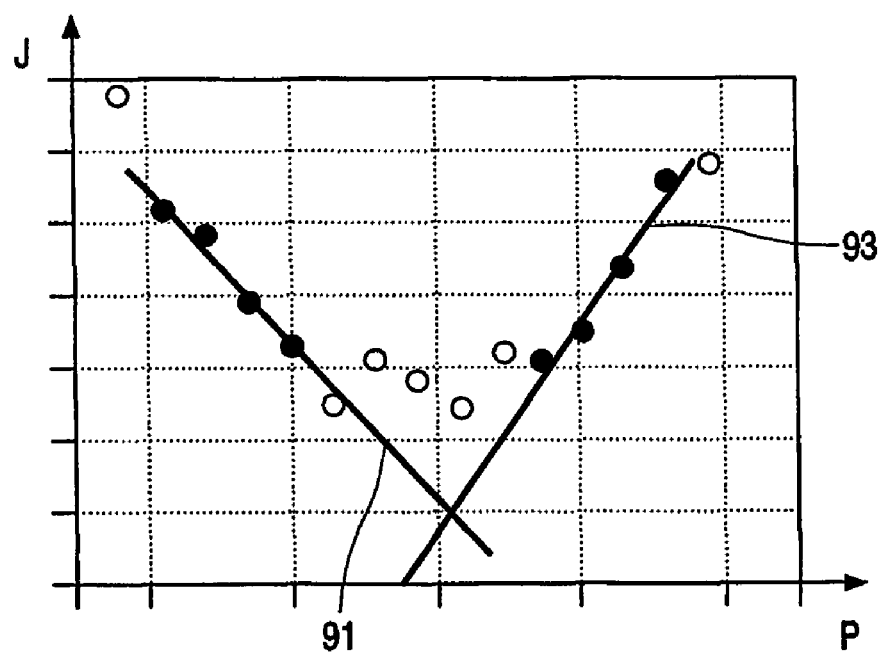
FIG. 4 shows jitter values in dependence with the recording power level of the laser irradiation and the two linear functions approximating the substantially monotonous parts of the dependence.

FIG. 4 shows jitter values in dependence with the pre-determined recording power level of the laser irradiation and the two linear functions 91, 93 approximating the substantially monotonous parts of the dependence 81. The full dots represent points forming the two series, whereas empty dots represents the points which were left out from the series.

Each series of points will be used for determining a linear function 91 or 93 approximating the substantially monotonous parts of the dependence 81 of jitter and pre-determined recording power level. Cartesian definition of the four-point set for a left part of the dependence are as follows:

$$a_{lx} = \frac{P_{l2} + P_{l3} + P_{l4}}{3} \qquad a_{ly} = \frac{J_{l2} + J_{l3} + J_{l4}}{3} \quad (2)$$

$$b_{lx} = \frac{P_{l3} + P_{l4} + P_{l5}}{3} \qquad b_{ly} = \frac{J_{l3} + J_{l4} + J_{l5}}{3}$$

From these points Cartesian definition of the linear function approximating the left part of the dependence 91 take the following form:

$$J_l(P_l) = \frac{b_{ly} - a_{ly}}{b_{lx} - a_{lx}}(P_l - a_{lx}) + a_{ly} \quad (3)$$

Similarly, the Cartesian definitions of the four-point set for a right part of the dependence are:

$$a_{rx} = \frac{P_{rN-3} + P_{rN-2} + P_{rN-1}}{3} \qquad a_{ry} = \frac{J_{rN-3} + J_{rN-2} + J_{rN-1}}{3} \quad (4)$$

$$b_{rx} = \frac{P_{rN-4} + P_{rN-3} + P_{rN-2}}{3} \qquad b_{ry} = \frac{J_{rN-4} + J_{rN-3} + J_{rN-2}}{3}$$

Hence, Cartesian definition of the linear function approximating the right part of the dependence 93 take the following is:

$$J_r(P_r) = \frac{b_{ry} - a_{ry}}{b_{rx} - a_{rx}}(P_r - a_{rx}) + a_{ry} \quad (5)$$

The jitter minimum is determined by the co-ordinates of the point where the function approximating the left part 91 of the dependence intersects the function approximating the right part 93 of the dependence. Hence, the optimum recording power level may be calculated form the following dependence:

$$P_{opt} = \frac{D_1 + D_2}{D_3} \quad (6)$$

where:

$D_1 = -a_{lx}b_{ly}b_{rx} + a_{lx}b_{ly}a_{rx} - a_{ry}b_{lx}b_{rx} + a_{ry}a_{lx}$ $D_2 = a_{ly}b_{lx}b_{rx} - a_{ly}b_{lx}a_{rx} + a_{rx}b_{ry}b_{lx} - a_{rx}a_{lx}b$ $D_3 = b_{ry}b_{lx} - b_{ry}a_{lx} - a_{ry}b_{lx} + a_{ry}a_{lx} - b_{ly}b_{rx} + b_l$

Once the optimum recording power level $P_{opt}$ has been determined by the control unit 61, the control signal $S_C$ representing its value, is supplied to the processing unit 21. The processing unit 21 supplies the recording unit 17 with the signal representing the value of the optimum recording power level $P_{opt}$ and this value is recorded in the control information of the record carrier 1. In another embodiment, information representing the value of the optimum recording power level is stored in the storage means 71.

Figure 5:
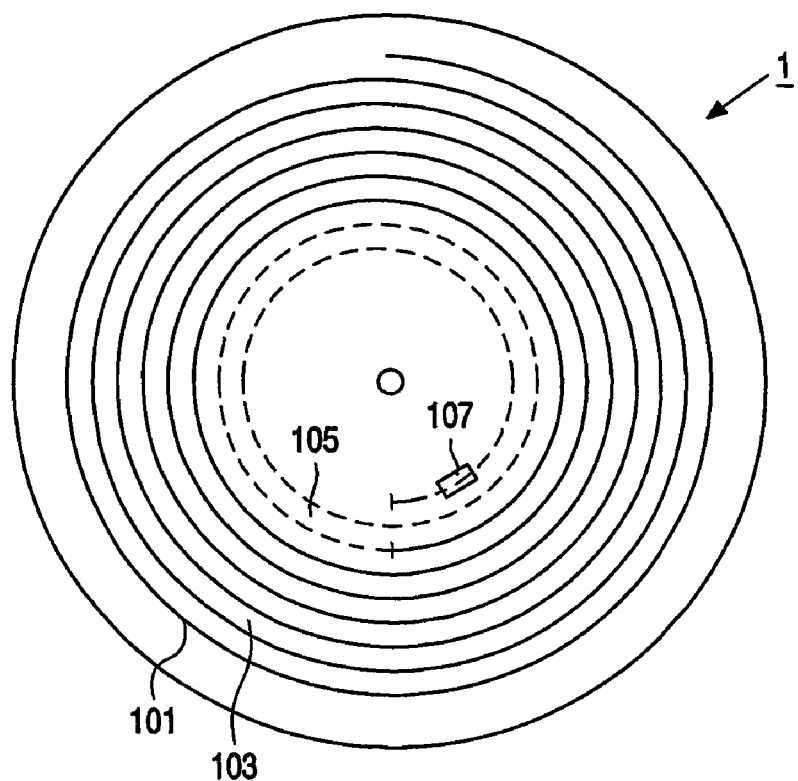
FIG. 5 shows an optical record carrier according to invention.

FIG. 5 shows a disc-shaped optical record carrier 1 according to the invention. Recording layer of the record carrier can be inscribed optically or magneto-optically by a recording device. Information on the record carrier is represented by pattern of marks. Information is recorded in track by a recording process in which each mark is formed by one or more recording pulses of constant or varying recording power level P. The recording parameters of the recording process, such as the recording power level P, the number of pulses are to be tuned for the record carrier, in particular due to its material properties. An example of an inscribable record carrier is the known CD Write-Once. The record carrier has a continuous track 101 intended for recording. The track 101 may be spiral and in the form of an embossed groove or ridge. The area of the record carrier is divided in an information recording area 103 for recording user information and control area 105 for storing information relevant for recording user information. The control area 105 is marked by a dashed track in the figure. The value of optimum recording power level $P_{opt}$ for recording the record carrier may be stored as a pattern of control information in the control area 105. When the control area is embossed, the manufacturer of the record carrier 1 must record the value. Alternatively, the value may be recorded by user during, for instance, initialization of the record carrier 1, allowing the recording of a carrier-specific value.

FIG. 6 shown a strongly enlarged portion 107 of the track comprising a pattern of marks 109 in which the control information is encoded.

Although has been explained by an embodiment using the recording power level as recording parameter, it will be clear that other recording parameters (e.g. specific timing of the recording pulse pattern for recording a mark) may be employed in the invention.

The invention claimed is:

1. A method of determining a value of a recording pulse parameter for optical record carrier recording, where recording pulses are applied to a recording surface of the optical record carrier for writing a pattern of optically readable marks on the record carrier, said method comprising:

writing test patterns with pre-determined values of the recording pulse parameter, said values being different for each test pattern; and reading the test pattern and forming a read signal; and measuring jitter values of the read signal corresponding to each test pattern; and forming a dependence of the jitter values versus the pre-determined values of the recording pulse parameter, where two substantially monotonous parts of the dependence are distinguished, each of the substantially monotonous part is approximated with a linear function and an intersection of the linear functions is determined in order to derive an optimised value of the recording pulse parameter.

2. A method of claim 1, where the recording pulse parameter is recording power level of the recording pulse.

3. A method of claim 1, where the optimised value of the recording pulse parameter is recorded on the optical record carrier.

4. A method of claim 1, where the optimised value of the recording pulse parameter is stored in a device for determining values of recording pulse parameter.

5. A device for determining values of recording pulse parameter for optical carrier recording, comprising:

recording unit for writing a pattern of optically readable marks on a record carrier by irradiating a recording surface of the record carrier with recording pulses;

a test signal generator for generating a test signal comprising a test pattern with pre-determined values of the recording pulse parameter and supplying the test signal to an input of a processing unit;

reading unit for reading marks on the record carrier and providing a read signal;

control unit for optimising the value of the recording pulse parameter and supplying a control signal representing the optimised recording pulse parameter;

a jitter detector for measuring jitter values of the read signal corresponding to the test patterns and supplying the jitter values to the control unit;

processing unit for converting input information to be recorded into an output signal, the output signal corresponding to radiation pulses and representing the input information, where optimised value of the recording pulse parameter is provided by the control signal where the control unit is arranged to form a dependence of the jitter values versus the pre-determined values of the recording pulse parameter and to derive the optimised value of the recording pulse parameter by determination of an intersection of two linear functions, where each linear function is an approximation of substantially monotonous part of the dependence.

6. A device of claim 5, comprising storage unit for storing of the optimised value of the recording pulse parameter.

7. An optical record carrier inscribable by recording pulses, comprising:

a substrate, and means on the substrate, including control information comprising a value of a recording pulse parameter, where the value of the recording pulse parameter is optimised by determination of an intersection of two linear functions, where each linear function is an approximation of substantially monotonous part of a dependence of measured jitter values versus pre-determined values of the recording pulse parameter.

8. An optical recording carrier of claim 7, where the recording pulse parameter is recording power level of the recording pulse.

* * * * *